United States Patent [19]
Ahopelto et al.

[11] Patent Number: 5,970,059
[45] Date of Patent: Oct. 19, 1999

[54] PACKET RADIO SYSTEM AND METHODS FOR A PROTOCOL-INDEPENDENT ROUTING OF A DATA PACKET IN PACKET RADIO NETWORKS

[75] Inventors: Juha-Pekka Ahopelto, Helsinki; Hannu Kari, Veikkola, both of Finland

[73] Assignee: Nokia Telecommunications Oy, Espoo, Finland

[21] Appl. No.: 08/875,464

[22] PCT Filed: Jan. 8, 1996

[86] PCT No.: PCT/FI96/00019

§ 371 Date: Jul. 9, 1997

§ 102(e) Date: Jul. 9, 1997

[87] PCT Pub. No.: WO96/21983

PCT Pub. Date: Jul. 18, 1997

[30] Foreign Application Priority Data

Jan. 10, 1995 [FI] Finland ..................................... 950116

[51] Int. Cl.⁶ ....................................................... H04J 3/16
[52] U.S. Cl. ........................................... 370/338; 370/401
[58] Field of Search ..................................... 370/389, 401,
370/402, 403, 404, 464, 465, 466, 503,
350, 338, 310, 312, 352, 392, 397, 351,
353; 379/90.01, 93.01, 93.33, 88.13, 88.2,
88.24, 142, 210, 211, 214; 455/403, 432,
517, 516, 524, 525

[56] References Cited

U.S. PATENT DOCUMENTS

| | | | |
|---|---|---|---|
| 4,755,992 | 7/1988 | Albal ........................................ | 370/389 |
| 5,251,205 | 10/1993 | Callon et al. ............................ | 370/401 |
| 5,313,465 | 5/1994 | Perlman et al. ......................... | 370/401 |
| 5,325,362 | 6/1994 | Aziz .......................................... | 379/60 |
| 5,590,133 | 12/1996 | Billstrom et al. ....................... | 370/349 |
| 5,717,689 | 2/1998 | Ayanoglu ................................ | 370/471 |
| 5,793,762 | 8/1998 | Panners et al. ......................... | 370/389 |

FOREIGN PATENT DOCUMENTS

| | | |
|---|---|---|
| 522 773 | 1/1993 | European Pat. Off. . |
| 692 897 | 1/1996 | European Pat. Off. . |

*Primary Examiner*—Dang Ton
*Attorney, Agent, or Firm*—Pillsbury, Madison & Sutro, LLP

[57] ABSTRACT

The present invention relates to a protocol-independent routing of data packets between a mobile station of a packet radio network and a party(Host) connected to an external network. In the invention, a data packet of an extraneous protocol(IPX) is transferred through a packet radio network using a second protocol as encapsulated in a data packet according to the second protocol. The transferring packet radio network does not thus need to understand the protocol of the transferred extraneous data packet or to be able to interpret the content of the data packet. A data packet network is connected to other packet radio networks, data networks or the backbone network between packet data networks via a gateway node(GPRS GSN), which uses the network-internal protocol towards the dedicated packet network and the protocol of each network towards other networks. When a data packet is transferred via a gateway node from a network into another network, the data packet is encapsulated in a packet according to the protocol of the new network. When the encapsulated data packet arrives in a node which supports the protocol of the encapsulated data packet, the encapsulation is stripped away and the data packet is routed forward according to the protocol of the data packet.

11 Claims, 13 Drawing Sheets

PACKET RADIO SYSTEM AND METHODS FOR A PROTOCOL-INDEPENDENT ROUTING OF A DATA PACKET IN PACKET RADIO NETWORKS

This application is the national phase of international application PCT/FI96/00019, filed Jan. 8, 1996 which designated the U.S.

FIELD OF THE INVENTION

The present invention relates to routing data packets independently of protocol between a mobile station of a packet radio network and a party connected to an external network.

BACKGROUND OF THE INVENTION

Mobile communication systems have been developed because there has been a need to allow people to move away from fixed telephone terminals without losing their ability to be reached. While the use of different data transmission services in offices has increased, different data services have also been introduced into mobile communication systems. Portable computers enable efficient data processing whereever a user moves. Mobile communication networks, provide a user with efficient access network to actual data networks for mobile data transmission. In order to do this, different new data services are designed for existing and future mobile communication networks. Digital mobile communication systems, such as the pan-European mobile communication system GSM (Global System for Mobile Communication), support particularly well mobile data transmission. General Packet Radio Service (GPRS) is a new service in the GSM system, and it is one the items of the standardization work of the GSM phase 2+ in ETSI (European Telecommunication Standard Institute). The GPRS operational environment consists of one or more sub-network service areas, which are interconnected by a GPRS backbone network. A sub-network comprises a number of packet data service nodes, which are referred to as GPRS support nodes (or agents) in this context, each packet data service node being connected to a GSM mobile communication network so that it is capable of providing packet data service for mobile data terminal equipment via several base stations, i.e. cells. The intermediate mobile communication network provides circuit switched or packet switched data transmission between a support node and mobile data terminal equipment. Different sub-networks are connected to an external data network, such as a public switched packet data network (PSPDN). The GPRS service thus produces packet data transmission between mobile data terminal equipment and external data networks with a, a GSM network acting as an access network. The GPRS service network operates almost independently of the GSM network. One of the requirements of the GPRS service is that it must operate with external PSPDNs of different types, for instance, with Internet or X.25 networks. In other words, the GPRS service and a GSM network should be capable of serving all users, irrespective of which type of data networks they want to register in via the GSM network. This means that the GSM network and the GPRS service have to support and handle different network addressing and data packet formats. This handling of data packets also comprises routing in a packet radio network. In addition, users should be able to roam from a GPRS home network into an extraneous GPRS network, the backbone network of the operator of which may support a different protocol (for instance, CLNP) than the home network (for instance, X.25).

SUMMARY OF THE INVENTION

The object of the present invention is to route data packets of different protocols in a packet radio system.

This is achieved with a packet radio network comprising a protocol-independent routing of data packets between a mobile station and a party connected to an external network. In packet radio network of the invention in the internal routing of the packet radio network, a data packet received from a mobile station or an external network is encapsulated according to the internal protocol of the packet radio network.

The present invention also relates to a method for a protocol-independent routing of packets in a packet radio network between a mobile station and a party connected to an external network. The method by encapsulating data packets received from the mobile station or from the external network, according to the protocol of the packet radio network, routing an encapsulated data packet in the packet radio network, according to the protocol of the packet radio network, and stripping the encapsulation according to the protocol of the packet radio network away, when the data packet is transferred from the packet radio network to the external network having a different protocol than the packet radio network.

The invention also relates to a method for routing a mobile terminated data packet from the sending party via an external network when the mobile station is located in its home packet radio network.

The invention also relates to a method for routing a mobile originated data packet via an external data network to the receiving party when the mobile subscriber is located in his home packet radio network or is visiting a packet radio network which supports the protocol of the receiving party.

The invention also relates to a method for routing a mobile terminated data packet when the mobile station is located outside the home packet radio network, and routing between packet radio networks is required.

The invention also relates to a method for routing a mobile originated data packet via an external data network to the receiving party when the mobile station is located outside the home packet radio network in an extraneous packet radio network which does not support the first protocol used by the mobile station.

The invention also relates to a method for routing a mobile originated data packet via a second packet radio network and an external data network to the receiving party when the mobile station is located outside the home packet radio network in an extraneous packet radio network which does not support the first protocol used by the mobile station.

In the invention, a data packet of an extraneous protocol is transferred through a packet radio network using another protocol encapsulated in a data packet according to this other protocol. The transferring packet radio network does not need to understand the protocol of the transferred extraneous data packet or to be able to interpret the contents of the data packet. A data packet network is connected to other data packet networks, data networks, or the backbone network between packet data networks via a gateway node, which uses the network-internal protocol towards the dedicated packet network and the protocol of each network towards other networks. When a data packet is transferred via a gateway node from a network into another network, the data packet is encapsulated in a packet according to the protocol of the new network. If the data packet was encapsulated also in the previous network, this previous encapsulation is stripped away before a new encapsulation. When the encapsulated data packet arrives in a node which supports the protocol of the encapsulated data packet, the encapsulation is stripped away and the data packet is routed forward according to the protocol of the data packet. The support node or the home node which sends the encapsulated packet to the gateway node does not need to know whether the gateway node supports the protocol of the encapsulated packet or not.

According to the invention, a mobile terminated or a mobile originated data packet can be routed through one or more packet radio networks or a network connecting them without any of the networks having to support the protocol used by the mobile station. The data packet is merely re-encapsulated in each network that uses an extraneous protocol. The invention enables the implementation of packet radio networks of different operators and that of networks connecting them by protocols differing from one another, without preventing, however, the roaming of a mobile station in networks of different operators and the routing of data packets.

The home support node of the home packet data network of a mobile station is provided with a database, which maps together the network address of the mobile station, for instance, in an IP network, X.25 network, CLNP network or in a number of these simultaneously, and the roaming number of the mobile station. The roaming number may consist of the identifier of that support node within the area of which the mobile station is located, and of the temporary, link-level identifier of the mobile station, which is received from said support node in connection with the registration or location updating of the mobile station. The roaming number is independent of the backbone network protocol used by the operator. The mobile station may have several protocols or several addresses with the same protocol. The invention also enables so-called virtual mobile stations; one mobile station is used by a number of users, each of which has a dedicated network address as mapped in the roaming number of the same mobile station, whereby the mobile station "appears" as several mobile stations. Due to the encapsulation procedure of the invention, a data packet arriving from an external network can always be routed, independently of the protocol of the packet, to the home support node of the mobile station, from where it can then be forwarded to the mobile station by means of the roaming number, which is found by means of the mobile station network address contained by the data packet. The mapping between the mobile station network address (for instance an IP address, X.25 address and/or CLNP address) and the mobile station roaming number is dynamic, because the roaming number changes every time the mobile station moves from the area of one support node into the area of another support node.

By the invention, it is also possible to shorten the routing of data packets originating from a mobile station which is located in an extraneous network.

BRIEF DESCRIPTION OF THE FIGURES

In the following, the invention will be described by means of preferred embodiments with reference to the accompanying drawing, in which.

DETAILED DESCRIPTION OF THE CURRENTLY PREFERRED EMBODIMENTS

The present invention can be used for routing data packets in packet radio systems of different types. The invention is particularly well suited to be used for implementing the general packet radio service GPRS in the pan-European digital mobile communication system GSM (Global System for Mobile Communication) or in corresponding mobile communication systems, such as DCS1800 and PCN (Personal Communication Network). In the following, the preferred embodiments of the invention will be described by means of a GPRS packet radio network consisting of the GPRS service and the GSM system, without restricting the invention to such a particular packet radio system, however.

Figure 1:
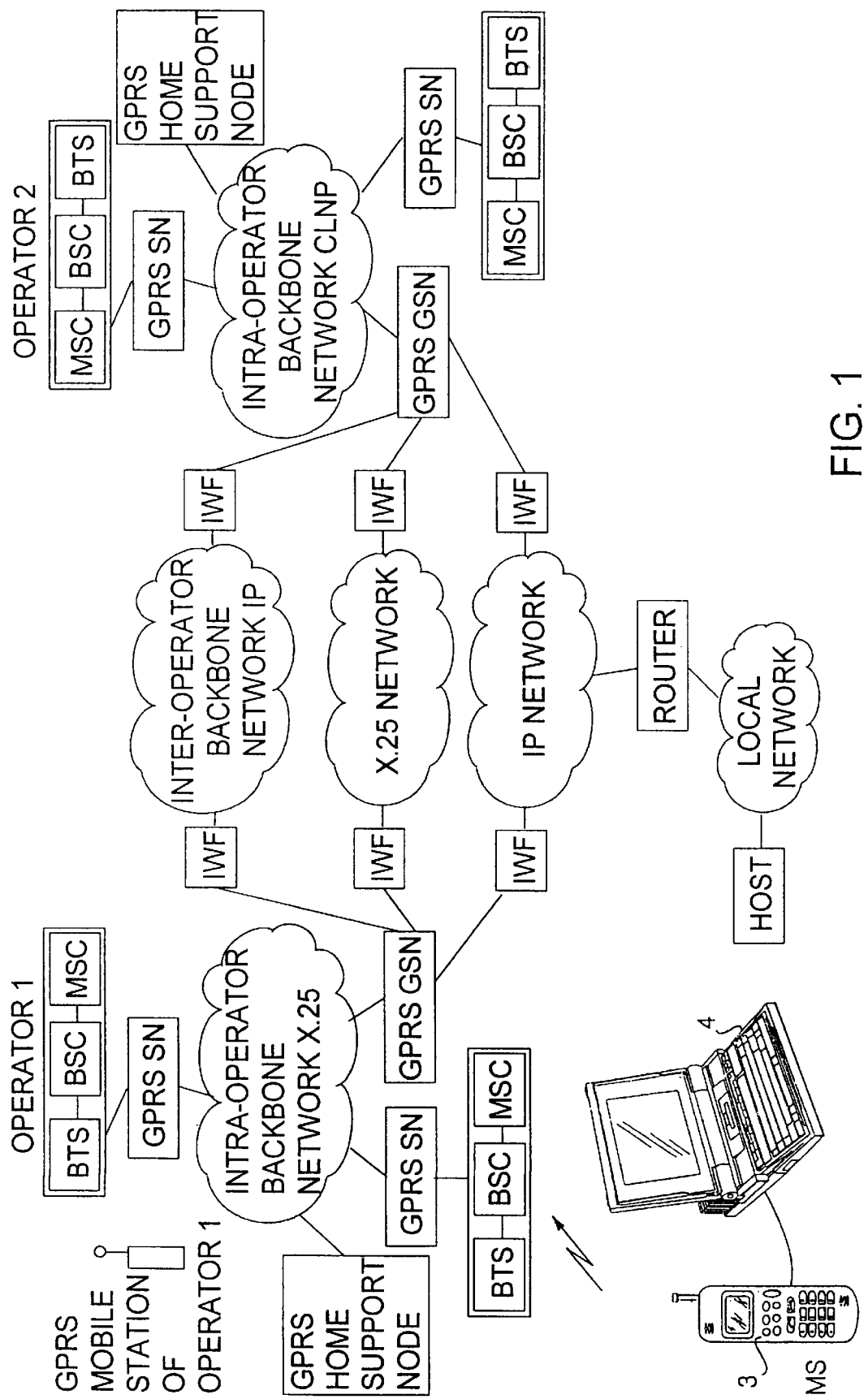
FIG. 1 shows two GPRS networks according to the invention and data networks associated with them.

FIG. 1 illustrates a telecommunication system which includes GPRS packet radio networks, local networks, data networks, etc. FIG. 1 shows two GPRS operators, operator 1 and operator 2, each of which has two GPRS support nodes (GPRS SN), one GPRS home support node (GPRS HSN), a GPRS gateway support node (GPRS GSN) and interworking functions (IWF). These different support nodes GPRS SN, GPRS HSN, and GPRS GSN are interconnected by the intra-operator backbone network.

Each support node GPRS SN controls a packet data service within the area of one or more cells in a cellular packet radio network. For this, each support node GPRS SN is connected to a certain local part of the GSM mobile system. This connection is typically provided in a mobile exchange, but in some situations it may be advantageous to provide the connection directly in the base station system BSS, i.e., in a base station controller BSC or one of the base stations BTS. The mobile station MS located in a cell communicates over the radio interface with a base station BTS and further through the mobile communication network with the support node GPRS SN to the service area of which the cell belongs. In principle, the mobile communication network existing between the support node GPRS SN and the mobile station MS merely delivers packets between these two. In order to do this, the mobile communication network may provide either a circuit switched connection or packet switched data packet transmission between the mobile station MS and the serving support node GPRS SN. An example of a circuit switched connection between a mobile station MS and a support node (agent) is provided in Finnish Patent Application 934115. An example of packet switched data transmission between a mobile station MS and a support node (agent) is provided in Finnish Patent Application 940314. However, it should be noticed that the mobile communication network provides merely a physical connection between the mobile station MS and the support node GPRS SN, and the exact operation and structure thereof do not have essential significance as regards the invention. As for more detailed description of the GSM system, reference is made, however, to ETSI/GSM specifications and to "The GSM System for Mobile Communications", M. Mouly and M. Pautet, Palaiseau, France, 1992, ISBN:2-9507190-07-7.

A typical mobile station constituting a mobile data terminal equipment consists of a mobile station 3 (MS) in a mobile communication network, and a portable computer 4 connected to the data interface of said mobile station MS. The mobile station 3 may be, for instance, a Nokia 2110, which is manufactured by Nokia Mobile Phones Ltd., Finland. By means of a PCMCIA-type Nokia Cellular Datacard, which is manufactured by Nokia Mobile Phones Ltd., the mobile station can be connected to any portable PC which is provided with a PCMCIA card location. The PCMCIA card thus provides the PC with an access point, which supports the protocol of the telecommunication application used in the PC 4, for instance CCITT X.25 or Internet Protocol IP. Alternatively, the mobile station may directly provide an access point which supports the protocol used by the application of the PC 4. Furthermore, it is possible that the mobile station 3 and the PC 4 are integrated into one unit within which the application program is provided with an access point supporting the protocol used by it.

A home support node GPRS HSN is used for storing the location information of GPRS mobile stations and for authenticating GPRS mobile stations. The GPRS HSN also routes mobile terminated (MT) data packets. The GPRS HSN also includes a database, which maps together the network address of a mobile station, for instance in an IP network, X.25 network, CLNP network or in a number of these simultaneously, and the GPRS roaming number GPRS-MRNB of the mobile station. The GPRS roaming number may consist of the identifier of that GPRS support node GPRS SN within the area of which the mobile station is currently located, and of the temporary, link-level identifier TLLI of the mobile station, which is received from said support node GPRS SN in connection with the registration or location updating of the mobile station. The mapping between the mobile station network address (for instance an IP address, X.25 address and/or CLNP address) and the mobile station roaming number GPRS-MRNB is dynamic, because the roaming number changes every time the mobile station moves from the area of one support node GPRS SN into the area of another support node. When the mobile station moves from one cell into another within the area of one support node GPRS SN, it is only necessary to perform a location updating in the support node GPRS SN, and there is no need to inform the home support node GPRS HSN of the change in location. When the mobile station moves from a cell of one support node GPRS SN into a cell of another GPRS SN within the area of the same operator, an updating is also performed in the home support node GPRS HSN to store the identifier of the new visited support node and the new roaming number GPRS-MRNB of the mobile station. When the mobile station moves from a cell located within the area of one operator into a cell located within the area of another operator, the new roaming number GPRS-MRNB of the mobile station and the new identifier of the visited support node are updated in the home support node GPRS HSN of the mobile station. The registration process of the mobile station is thus in principle the same as within the area of one operator.

The intra-operator backbone network, which interconnects the equipments GPRS HSN, GPRS SN and GPRS GSN of the operator, may be implemented, for instance, with a local network. It should be noticed that it is also possible to implement a GPRS network of an operator without an intra-operator backbone network, for instance, by implementing all aspects in a single computer, but this modification does not cause any changes in the manner the routing protocols of the invention behave.

A GPRS gateway support node GPRS GSN connects the operator to the GPRS systems of the other operators of the GPRS network and to data networks, such as an inter-operator backbone network, IP network, or X.25 network. An interworking function IWF is provided between the gateway support node GPRS GSN and the other networks. It should be noticed that a GPRS network can be implemented without the gateway support node GPRS GSN, but in such a case all support nodes GPRS SN and home support nodes GPRS HSN should use the same protocol towards the inter-operator backbone network as the gateway support nodes GPRS GSN of the other operators.

An inter-operator backbone network is a network via which the gateway support nodes GPRS GSN of different operators can communicate with one another. This communication is required to support GPRS roaming between different GPRS networks. This inter-operator backbone network can be implemented by using for instance X.25, IP, CLNP, or other networks, as long as the gateway support nodes GPRS GSN of both parties use the same protocols towards the inter-operator backbone network.

For instance, if the inter-operator backbone network is an IP network, the operator 1 may internally use an X.25 network (in the intra-operator backbone network of the operator 1), and the operator 2 may internally use an CLNP network (in the intra-operator backbone network of the operator 2). The gateway support node GPRS GSN of the operator 1 should thus use the X.25 protocol locally and the IP protocol towards the inter-operator backbone network over the interworking function IWF. Correspondingly, the gateway support node GPRS GSN of the operator 2 should use the CLNP protocol locally and the IP protocol over the interworking function IWF.

FIG. 1 also shows a host computer Host, which is connected to a local network, which is further connected via a router to an IPX network. A similar connection can also be constructed in other data networks, such as an X.25 network.

In the following, the present invention will be described by an example, assuming that the host computer Host desires to send messages to a GPRS mobile station and receive messages therefrom by using IPX protocols. IPX protocol is used only as an example in this context, and the routing events described below are implemented in the same manner also when IP, X.25, or CLNP protocols are used as end-to-end protocols. In this example, it is also assumed that the intra-operator backbone network of the operator 1 is based on a X.25 network and that the intra-operator backbone network of the operator 2 is based on a CLNP network, whereas the inter-operator backbone network is based on the IP protocol. The purpose of this configuration is merely to illustrate how the routing of a message can be handled despite the fact that different network protocols are used in different networks.

Routing packets within the GPRS network of one operator

The routing procedure of the invention when a mobile station is located in its GPRS home network, and inter-operator routing is not required is described. In the routing example presented below, IPX data packets are used, but a similar routing mechanism can also be used in connection with other protocols, such as IP, X.25, and CLNP.

Mobile terminated (MT) packets

Figure 2:
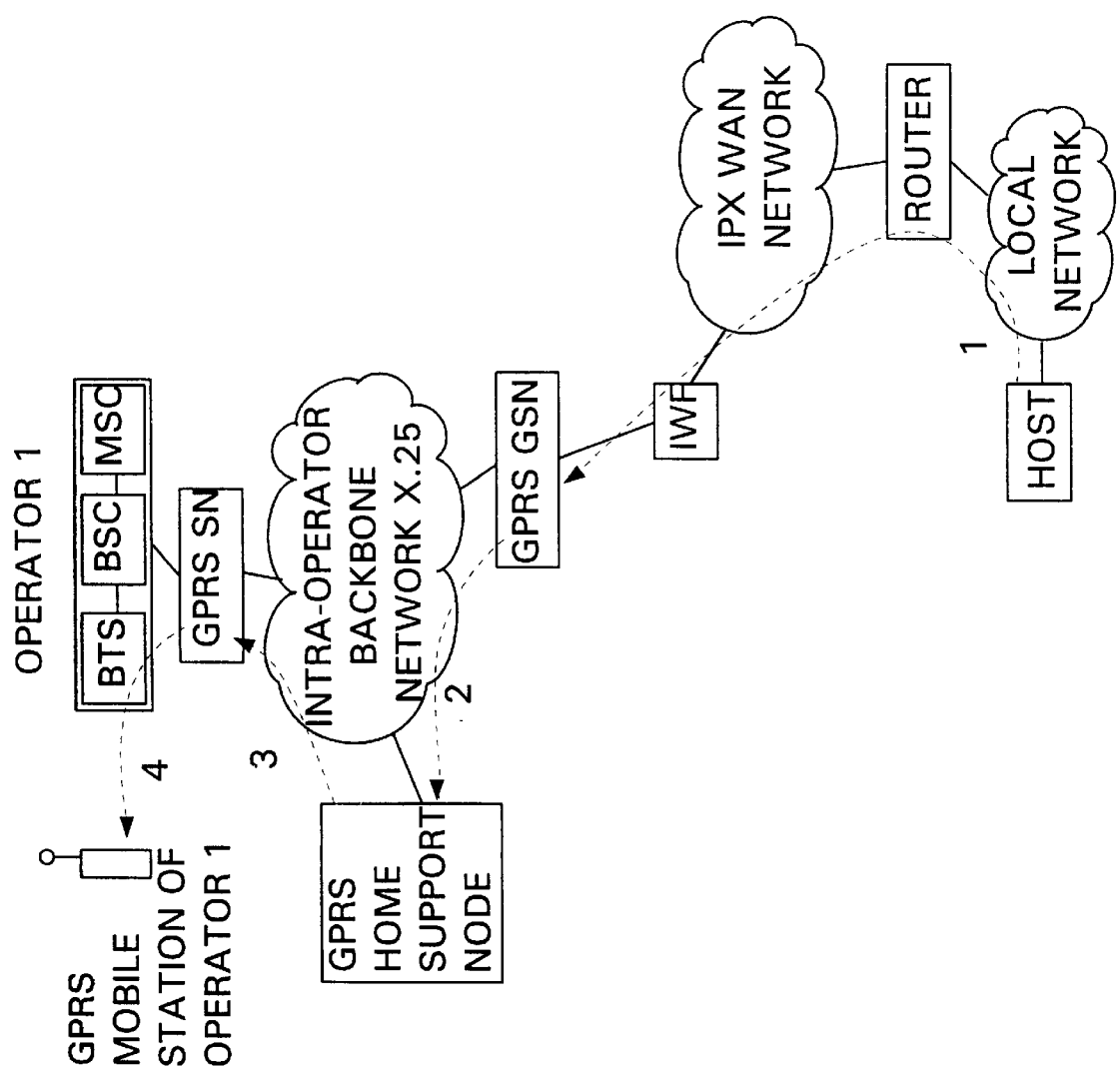
FIG. 2 is a block diagram.
Figure 3:
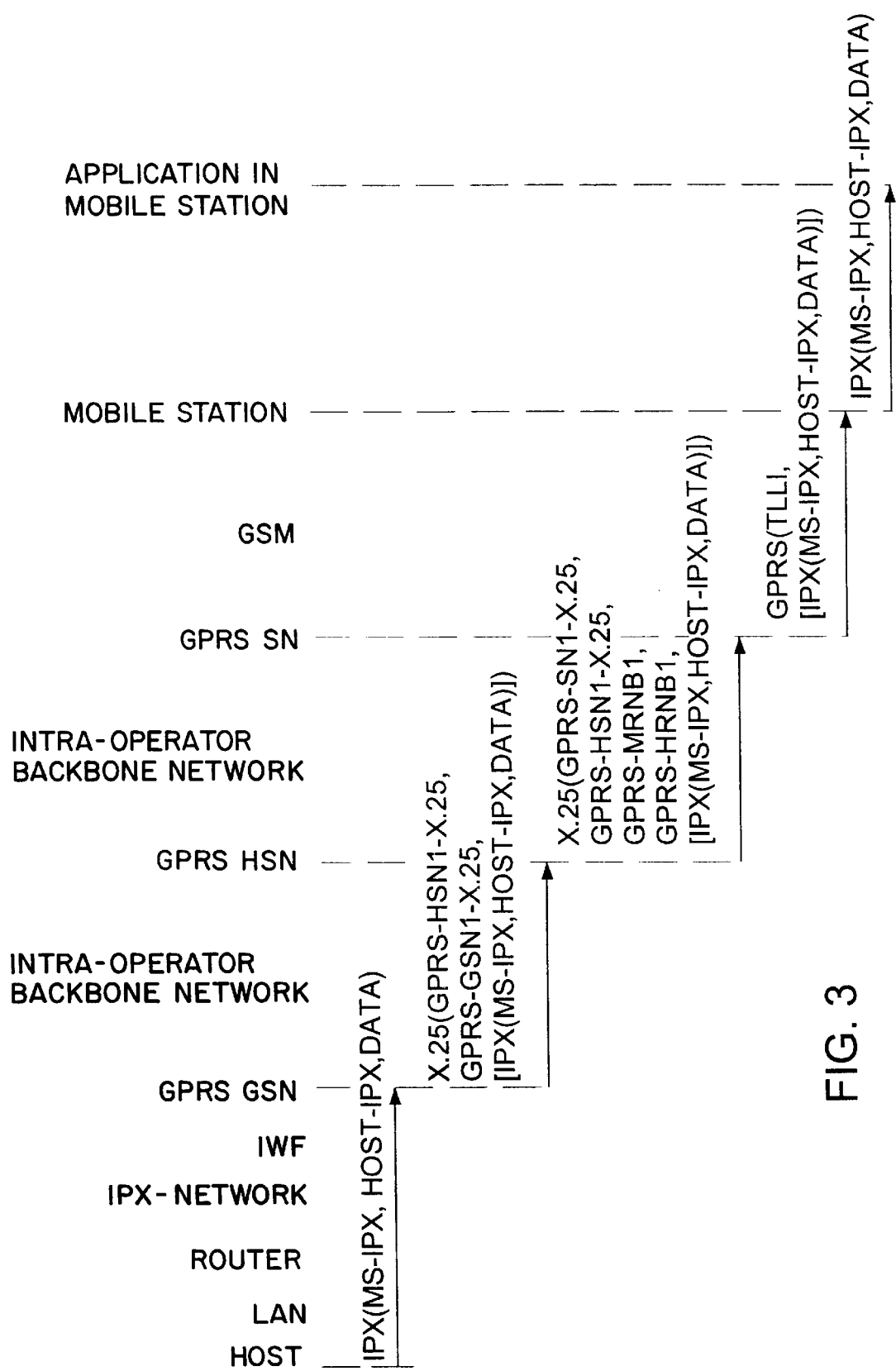
FIG. 3 is a signaling diagram which illustrate the routing of a mobile terminated packet according to the invention.

FIG. 2 illustrates the routing of mobile terminated (MT) packets when the host computer Host sends an IPX packet to a mobile station of the operator 1 by using an IPX message. The routing event is also shown in FIG. 3 as a signaling diagram. The numbering used in the following description corresponds to that used in FIGS. 2 and 3.

1. The host computer Host sends a data packet, which contains the IPX address MS-IPX of the mobile station, the IPX address Host-IPX of the host computer and data, by using normal IPX message structures. The data packet contains the IPX address of the mobile station. The data packet is forwarded via the local network, router, IPX data network, and interworking function IWF to the gateway support node GPRS GSN of the operator 1 by using normal IPX routing methods and the IPX address of the mobile station.

2. The GPRS GSN encapsulates the received IPX packet in an X.25 packet, which is used in the intra-operator backbone network of the operator 1. The X.25 packet is provided with the address GPRS-HSN1-X.25 of the home support node of the operator 1 and with the address GPRS-GSN1-X.25 of the gateway support node. The GPRS GSN forwards the X.25 packet to the home support node GPRS HSN via the intra-operator backbone network of the operator 1. The encapsulation format may be, for instance, the same as the one used in Point-to-Point Protocol PPP, which will be described in more detail below. (PPP) also contains an identification field, which can be used for determining the protocol type of the encapsulated data packet (IPX, in this case). The GPRS GSN forwards the X.25 packet to the home support node GPRS HSN via the intra-operator backbone network of the operator 1.

3. The GPRS HSN receives the X.25 packet and checks the actual receiver, i.e., the IPX address MS-IPX of the mobile station. The GPRS HSN finds the GPRS roaming number GPRS-MRNB of the mobile station in its internal database by means of the IPX address MS-IPX of the mobile station. It should be noticed that the home support node GPRS HSN does not necessarily have to use IPX protocols itself or be familiar with the IPX routing mechanism, but it only needs to know the association between IPX addresses and mobile stations. If the mobile station has other network addresses (for instance an IP, X.25 and/or CLNP address), the roaming number is found in the same manner by mapping of the database of the home support node. Finally, in the example of FIGS. 2 and 3, the GPRS HSN encapsulates the IPX packet in an X.25 packet, which also contains the address GPRS-SN1-X.25 of the visited support node, the home support node's own address GPRS-HSN1-X.25, the roaming number GPRS-MRNB1 of the mobile station, and the home roaming number GPRS-HRNB. The home roaming number is the roaming number of the home location register of the mobile station in a GPRS network. The GPRS HSN then sends the encapsulated data packet forward to said support node GPRS SN.

4. The support node GPRS SN receives the IPX data packet encapsulated in the X.25 packet, encapsulates the IPX data packet in a GPRS radio link protocol data packet, and sends it over the GPRS radio interface to the mobile station. The GPRS packet also contains the TLLI of the mobile station. The exact implementation of the radio link protocol is not essential as regards the invention. As an example of sending data packets over the GPRS interface, a copending Finnish Patent Application 950117 is referred to. The support node GPRS SN does not need to understand the protocol (IPX, in this case) the mobile station uses.

5. The mobile station receives the GPRS packet over the radio interface and forwards the IPX packet provided therein to the application associated with the mobile station.

Mobile originated (MO) packets

Figure 4:
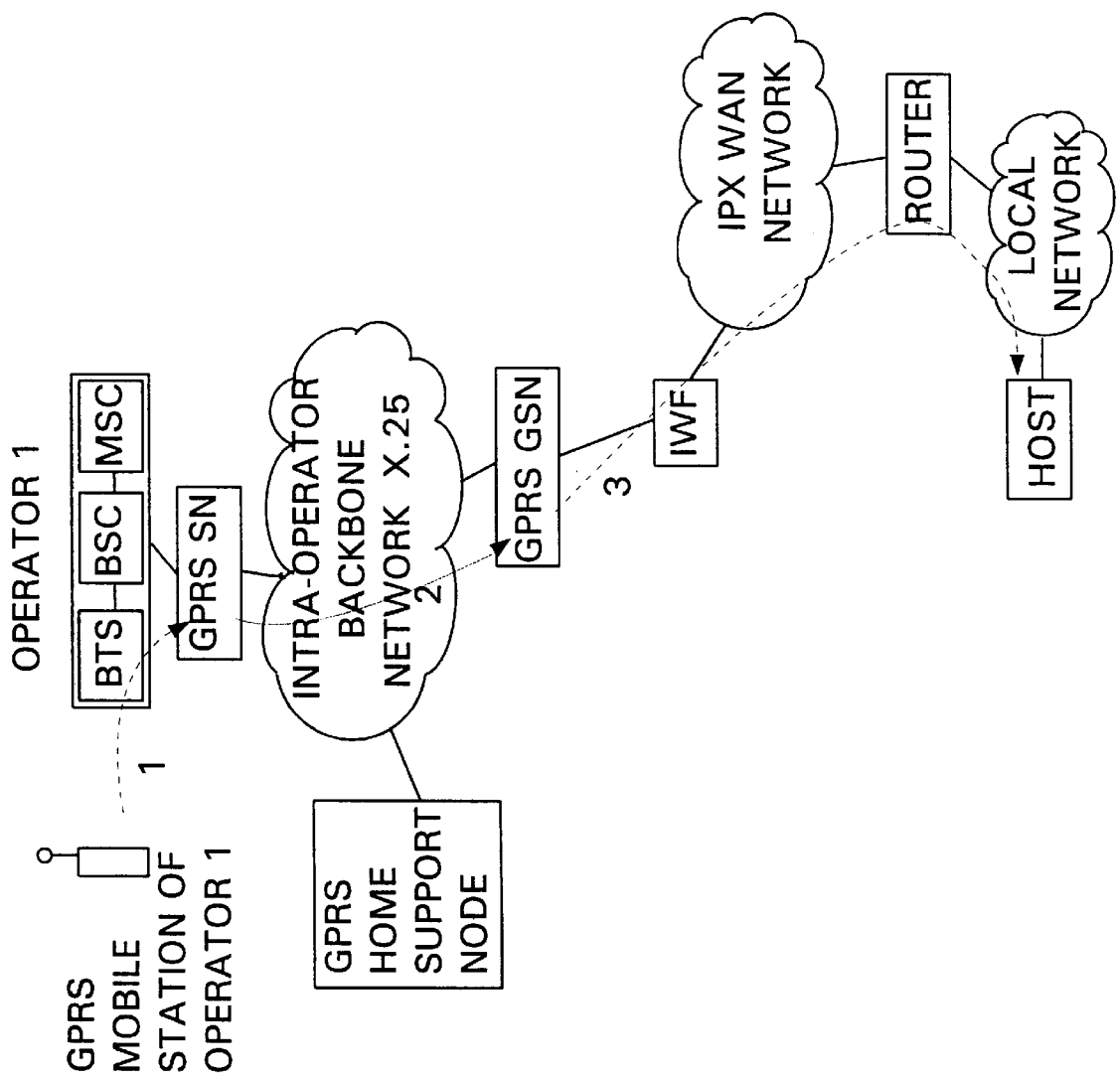
FIG. 4 is a block diagram.
Figure 5:
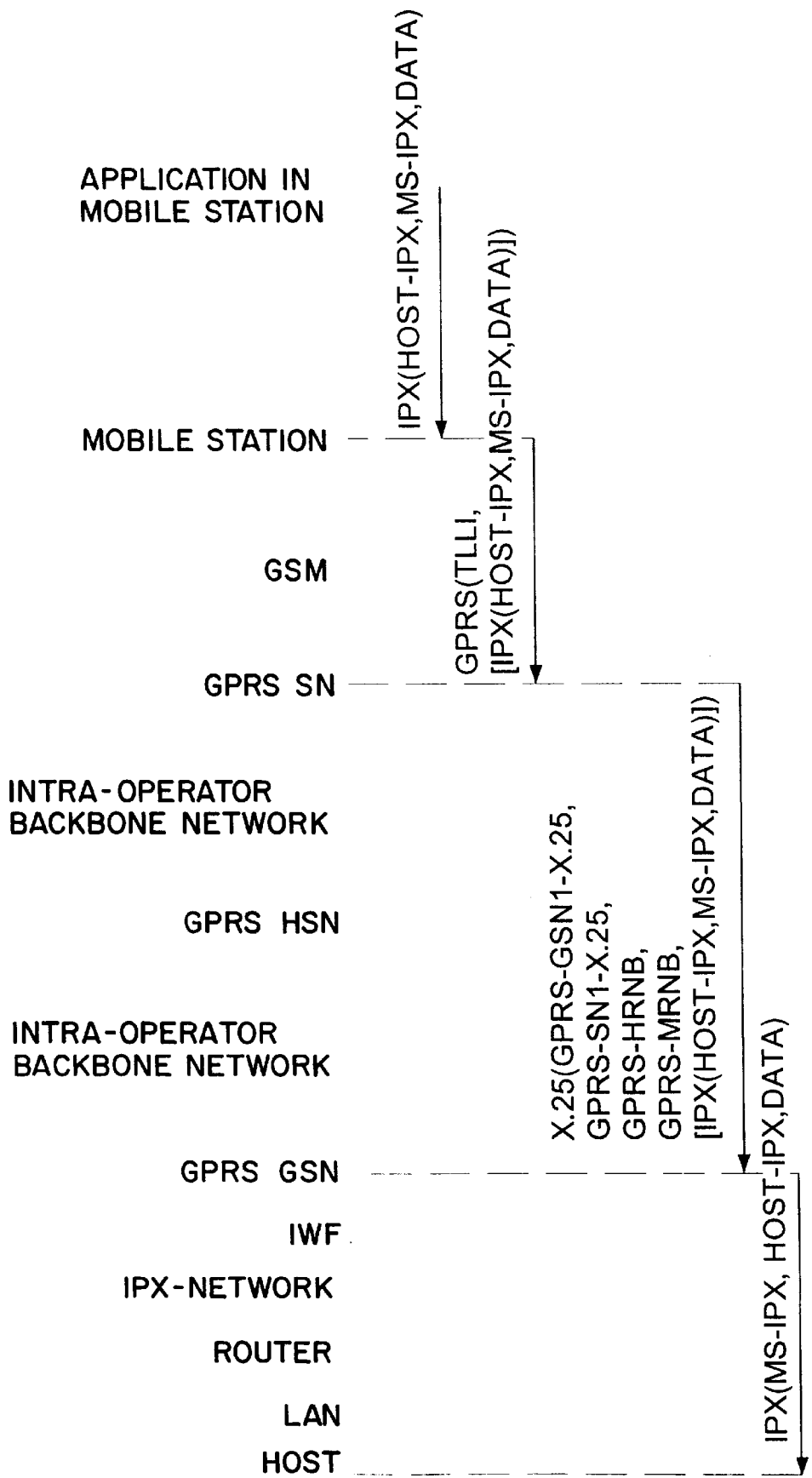
FIG. 5 is a signal diagram which illustrate the routing of a mobile originated packet according to the invention.

The following is a description of MO packet routing with reference to FIG. 4 in a situation where a mobile station sends an IPX packet to the host computer Host. The same routing event is presented by means of a signalling diagram in FIG. 5. The numbering used in the following corresponds to that used in FIGS. 4 and 5.

The mobile station receives, from the application associated with it, an IPX packet, which contains the IPX address Host-IPX of the host computer, the IPX address MS-IPX of the mobile station, and data.

1. The mobile station encapsulates the IPX packet in a GPRS packet, which also contains the TLLI of the mobile station. The mobile station sends the GPRS packet over the radio interface to the serving support node GPRS SN.

2. The GPRS SN receives the GPRS packet over the air interface, and encapsulates the IPX packet provided therein in an X.25 packet without interpreting the contents of the encapsulated IPX packet in more detail. The support node GPRS SN does not thus need to understand the protocol used by the mobile station (IPX). The GPRS SN also includes the X.25 address GPRS-GSN1-X.25 of the gateway support node, its own address GPRS-SN1-X.25, the roaming number GPRS-MRNB of the mobile station, and the home roaming number GPRS-HRNB in the X.25 packet. Thereafter, the GPRS SN routes the X.25 packet to the gateway support node GPRS GSN by using the X.25 backbone network.

3. The GPRS GSN receives the X.25 data packet and checks the protocol of the encapsulated IPX packet. Since the GPRS GSN supports the IPX protocol itself (towards the data networks), it strips the X.25 encapsulation away and sends the IPX packet via IPX remote networks to the host computer Host by using normal IPX routing mechanisms.

Inter-operator packet routing

The routing principle of packet data when a mobile station is riot located within its GPRS home network, and inter-operator routing is required is described.

Mobile terminated (MT) packets

Figure 6:
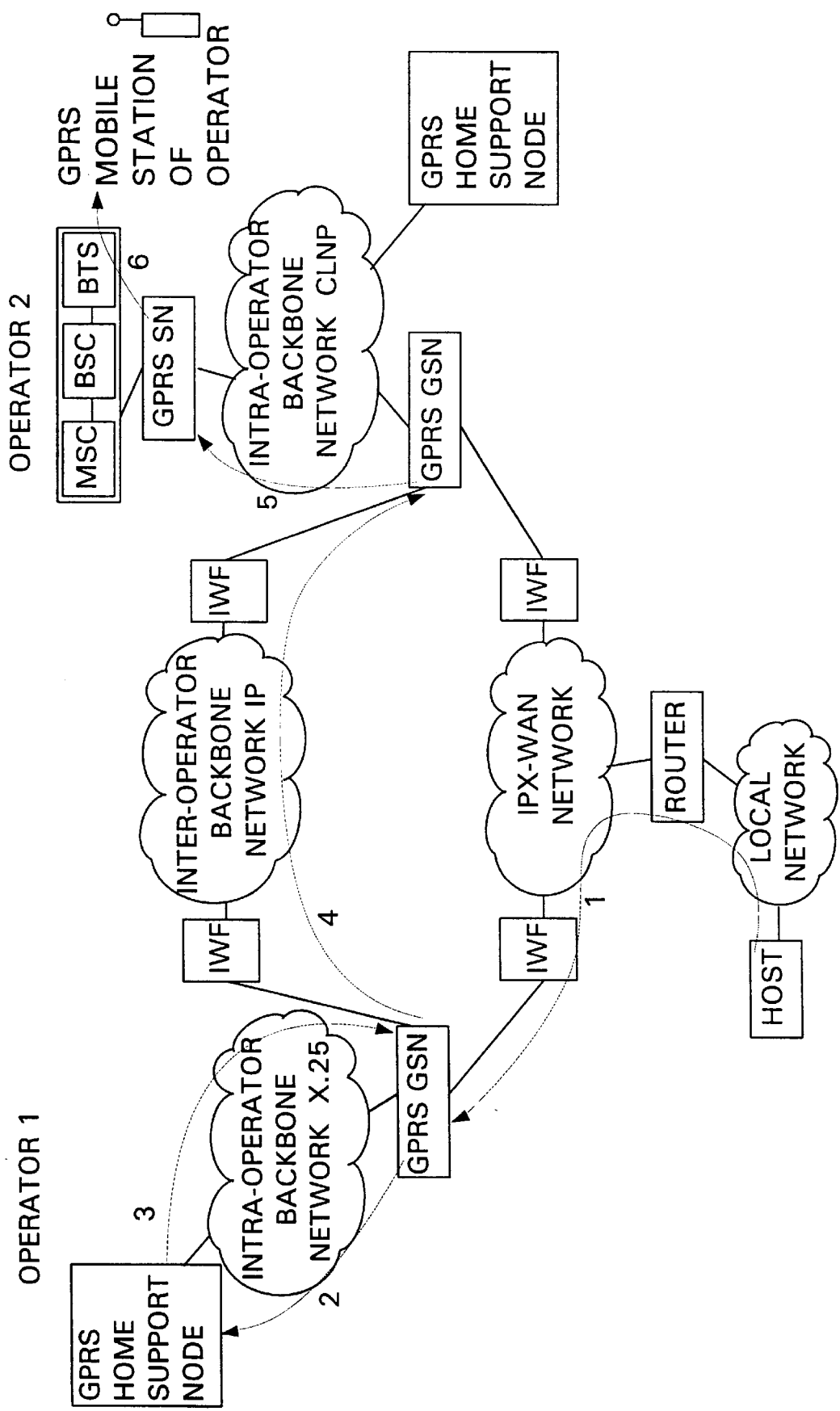
FIG. 6 is a block diagram.
Figure 7:
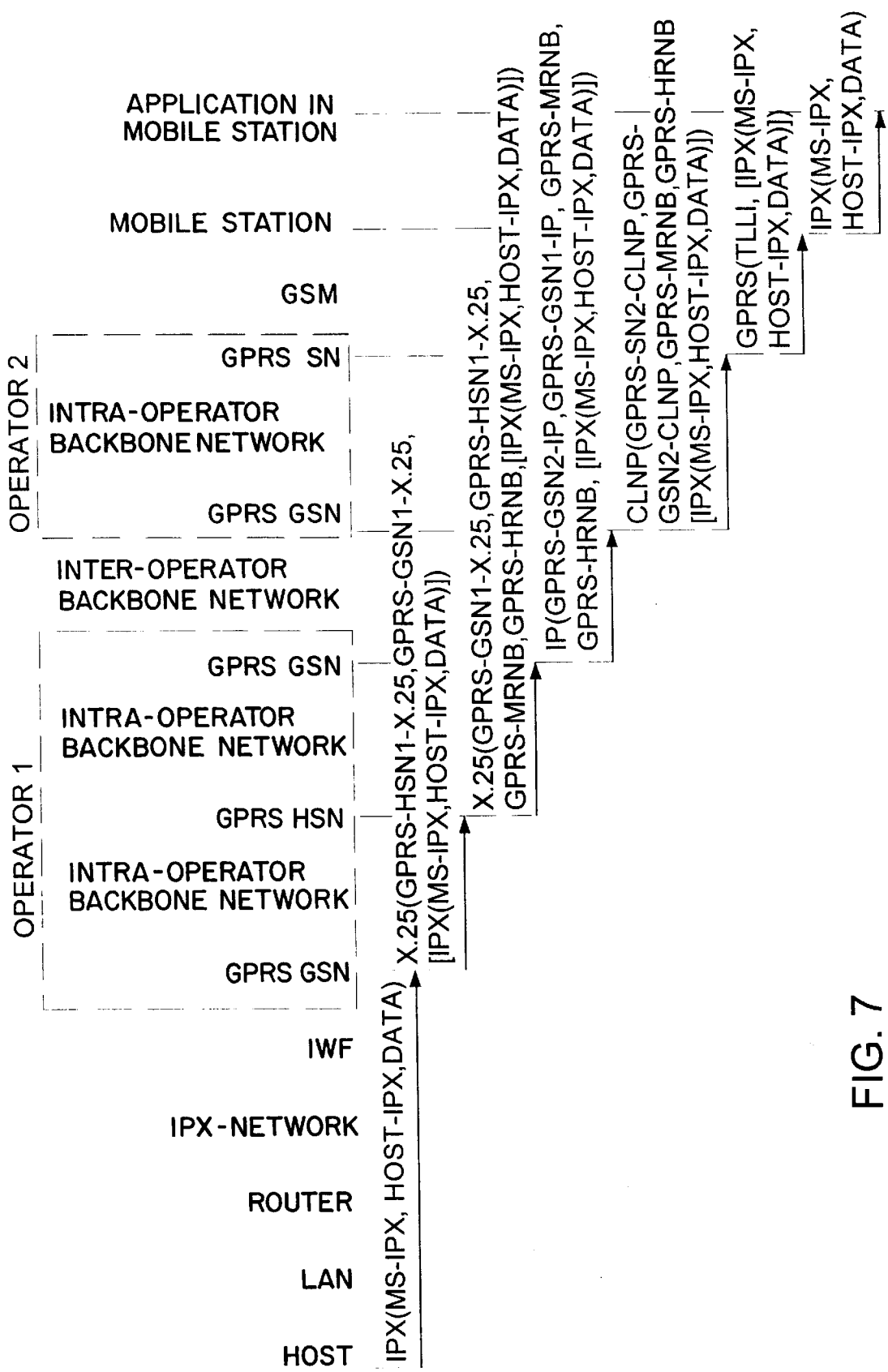
FIG. 7 is a signaling diagram which illustrate the routing of a mobile terminated packet according to the invention when the mobile station is located in an extraneous GPRS network.

The following is a description of MT packet routing with reference to FIGS. 6 and 7 when a mobile station is located outside its home network, and the host computer Host sends an IPX packet to the mobile station by using an IPX message.

1 and 2. The sending of the IPX packet from the host computer Host to the gateway support node of the operator 1 and therefrom further to the home support node GPRS HSN is identical with FIGS. 2 and 3.

3. The GPRS HSN receives the X.25 packet and checks the actual receiver by means of the IPX address MS-IPX of the mobile station. By the IPX address MS-IPX, the GPRS HSN finds the GPRS roaming number GPRS MRNB of the mobile station. In this case, the mobile station is not located within the same network, wherefore the GPRS HSN encapsulates the IPX packet in an X.25 packet and sends the X.25 packet to the gateway support node GPRS GSN.

4. The GPRS GSN contains the addresses of the gateway support nodes GPRS GSN of the other operators. The GPRS GSN checks the roaming number GPRS MRNB of the mobile station and encapsulates the IPX packet in an IP packet, which also contains the IP address GPRS-GSN2-IP of the gateway support node of the operator 2, its own IP address GPRS-GSN1-IP, the roaming number GPRS-MRNB of the mobile station and the home roaming number GPRS-HRNB. Thereafter, the GPRS GSN sends the IP packet to the gateway support node GPRS GSN of the operator 2 via the inter-operator backbone network.

5. The GPRS GSN of the operator 2 strips the encapsulation of the original IPX packet away in the IP packet and re-encapsulates it in a CLNP packet, which also contains the address GPRS-SN2-CLNP of that support node GPRS SN where the mobile station is located, the gateway support node's own address GPRS-GSN2-CLNP, and the roaming number GPRS-MRNB of the mobile station and the home roaming number GPRS-HRNB. The GPRS GSN of the operator 2 then forwards the CLNP packet via the intra-operator backbone network (CLNP) to the support node GPRS SN.

6. The GPRS SN strips the encapsulation of the IPX packet away and re-encapsulates it in a GPRS packet, which also contains the TLLI of the mobile station. The GPRS SN sends the GPRS packet over the radio interface to the mobile station.

7. The mobile station receives the GPRS packet over the radio interface and strips the encapsulation of the IPX packet away. Thereafter, the mobile station forwards the IPX packet to the application associated with it.

The roaming number GPRS-MRNB and the home roaming number GPRS-HRNB of the mobile station are forwarded with the packets all the distance between the GPRS HSN and the GPRS SN of the operator 2. Based on these numbers, each node provided along the route is able to route the packet forward by the protocol and addressing used in each network.

Mobile originated (MO) packets

There are three alternatives for handling MO packets:
the visited GPRS system supports the protocol of the mobile station,
the visited GPRS system does not support the protocol of the mobile station, and the data is routed via the home GPRS GSN of the mobile station,
the visited GPRS system does not support the protocol of the mobile station, and the data is routed via the GPRS GSN of a third party.

Visited operator supports the protocol of the mobile station

Figure 8:
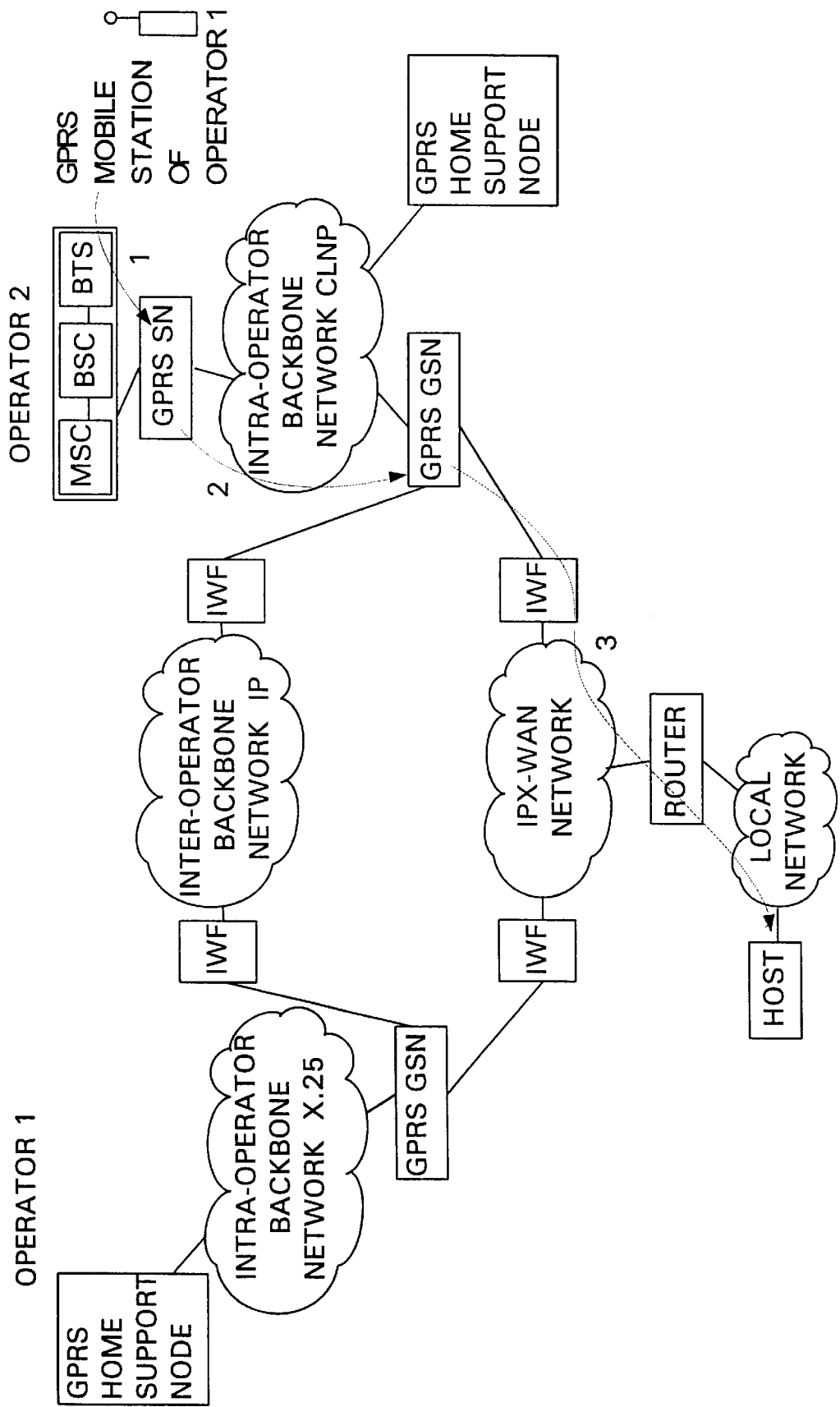
FIG. 8 is a block diagram.
Figure 9:
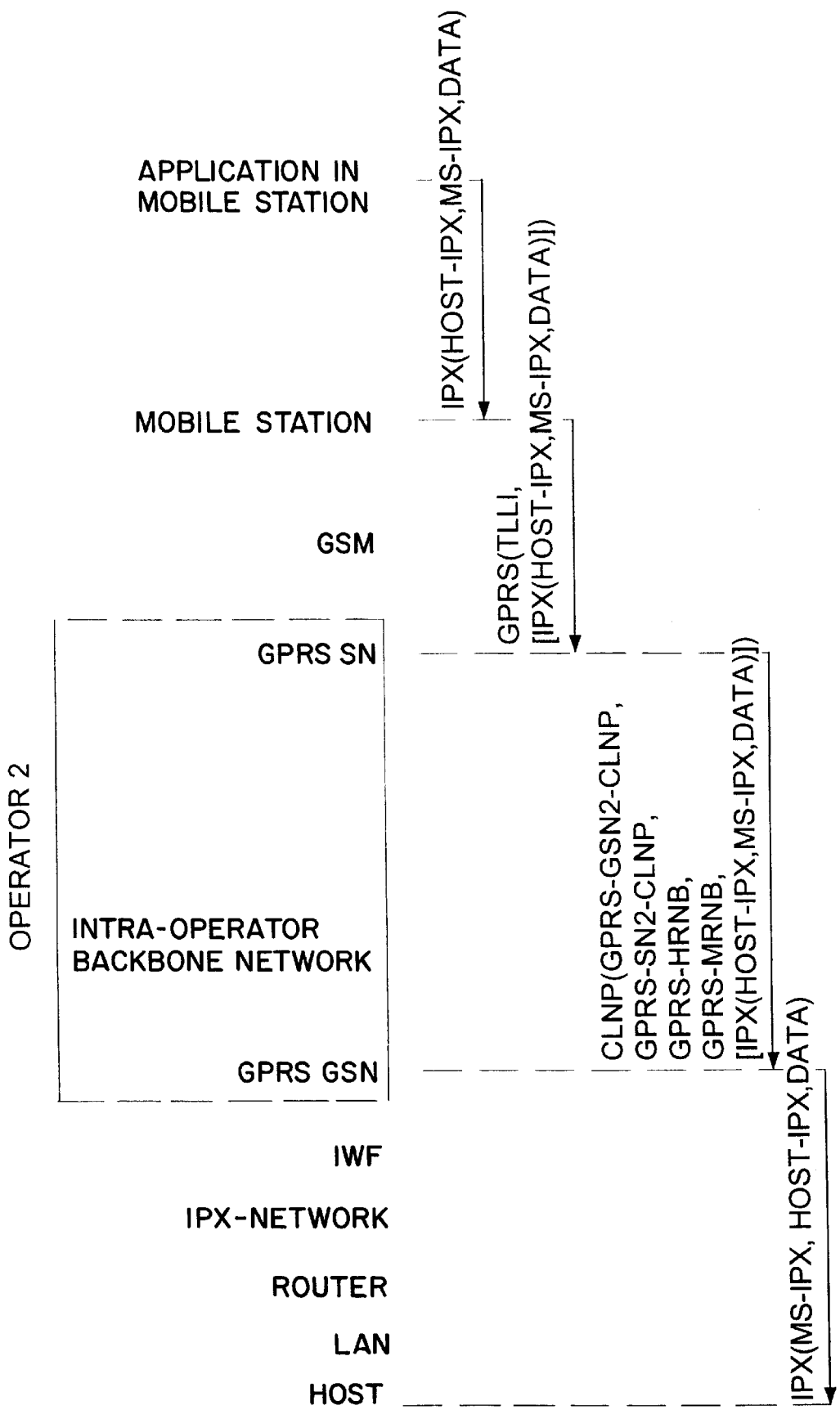
FIG. 9 is a signaling diagram which illustrate the routing of a mobile originated packet according to the invention when the mobile station is located in an extraneous GPRS network which supports the protocol of the mobile station.

The following is a description of MO packet routing with reference to FIGS. 8 and 9 when a mobile station is located outside its home network, and the visited network understands the protocol of the mobile station. In the example, the mobile station sends an IPX packet to the host computer Host.

The mobile station receives an IPX packet from the application associated with it.

1. The mobile station encapsulates the IPX packet in a GPRS packet, which also contains the TLLI of the mobile station. The mobile station sends the GPRS packet over the radio interface to the serving support node GPRS SN of the operator 2.

2. The GPRS SN receives the GPRS packet and encapsulates the IPX packet in a CLNP packet without interpreting the contents of the IPX packet. Thereafter, the GPRS SN forwards the CLNP packet to the gateway support node GPRS GSN of the operator 2 by using the intra-operator backbone network of the operator 2 (CLNP). The visited support node GPRS SN of the operator 2 does not need to know if the system supports the protocol used by the mobile station, since the packet structure sent to the gateway support node GPRS GSN is the same in all cases.

3. The GPRS GSN receives the CLNP packet and strips the encapsulation of the IPX packet away. Since the GPRS GSN supports the IPX protocol towards the data networks itself, it sends the IPX packet via IPX networks to the host computer Host by using normal IPX routing mechanisms.

Visited network does not support the protocol of the mobile station

Figure 10:
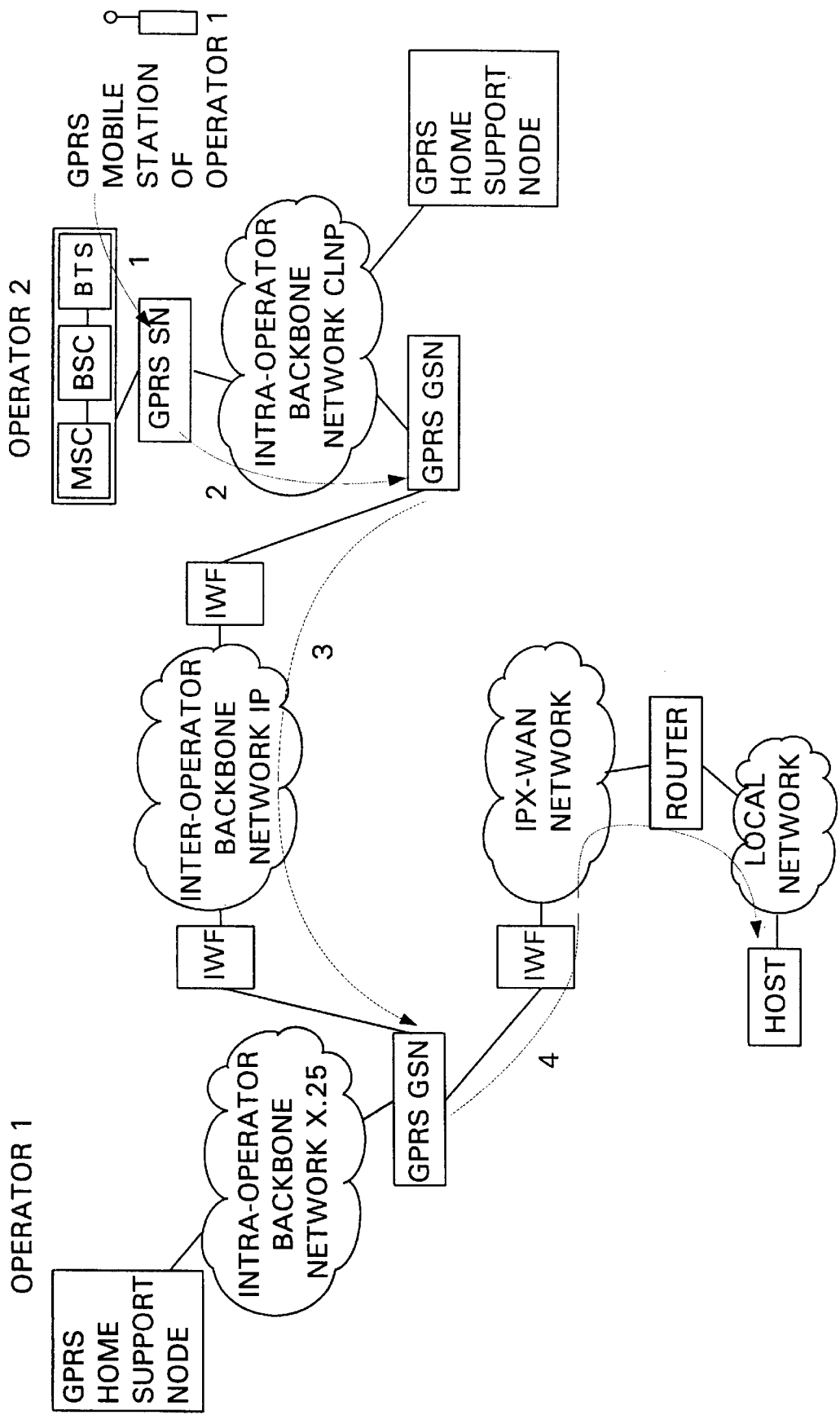
FIG. 10 is a block diagram.
Figure 11:
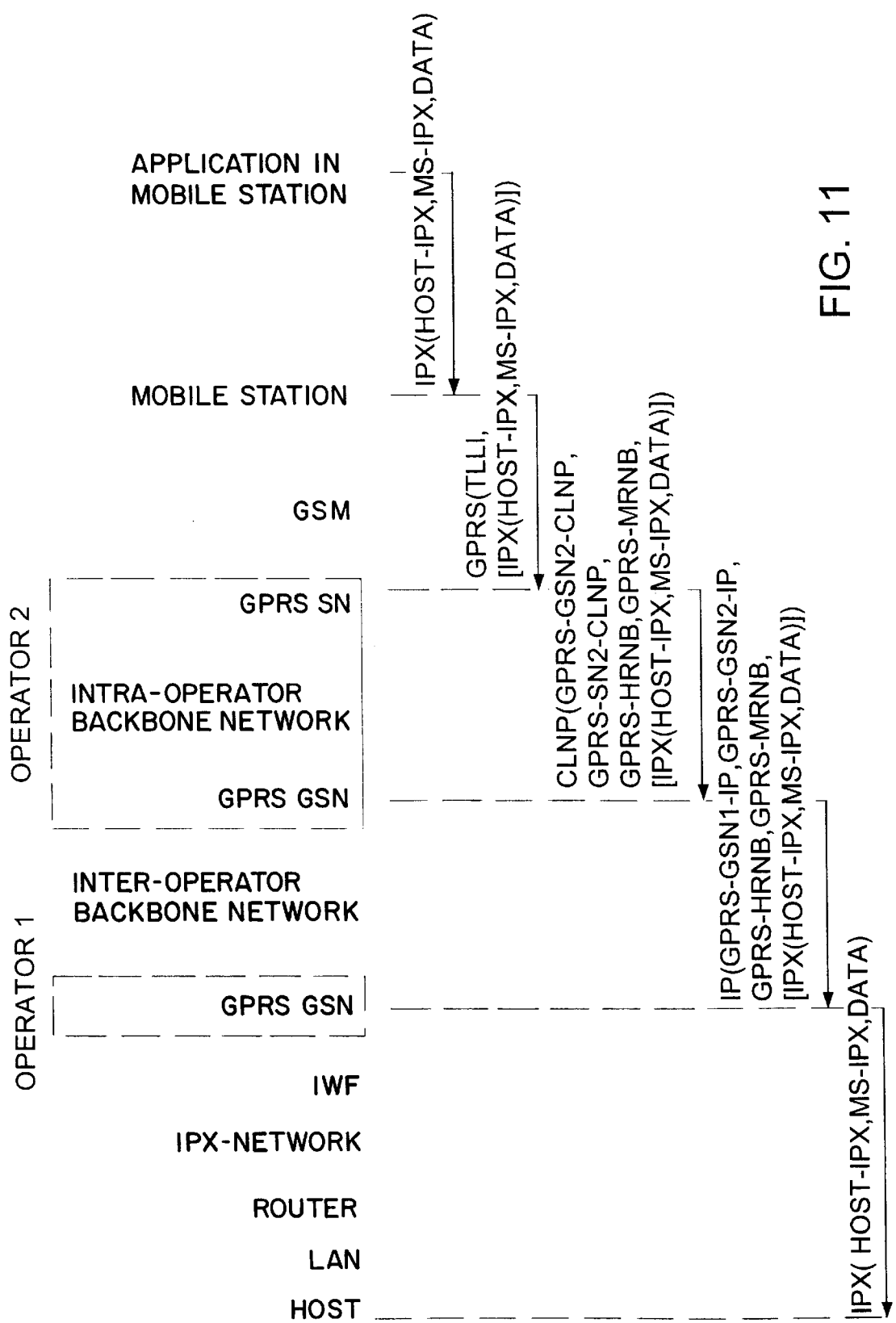
FIG. 11 is a signaling diagram which illustrate the routing of a mobile originated packet according to the invention when the mobile station is located in an extraneous GPRS network, and the packet is forwarded via the home network.

The following is a description of MO packet routing with reference to FIGS. 10 and 11 when a mobile station is located outside its own home network, and the visited network does not support the protocol of the mobile station, as a result of which the packet must be routed via the operator 1. In the example, the mobile station sends an IPX packet to the host computer.

1 and 2. These stages are identical with the stages 1 and 2 of FIGS. 8 and 9.

3. The GPRS GSN receives the CLNP packet and checks the protocol of the IPX packet. Since the GPRS GSN does not support the IPX protocol towards the data networks itself, it encapsulates the original IPX packet in an IP packet, which is sent to the gateway support node GPRS GSN of the operator 1.

4. The GPRS GSN of the operator 1 receives the IPX packet encapsulated in the IP packet and checks its protocol. Since the GPRS GSN of the operator 1 supports the IPX protocol towards the data networks itself, it strips the encapsulation away and sends the original IPX packet via IPX networks to the host computer Host.

The packet can also be routed via the network of the operator 1 in a forced manner, for instance, for billing or security reasons.

Figure 12:
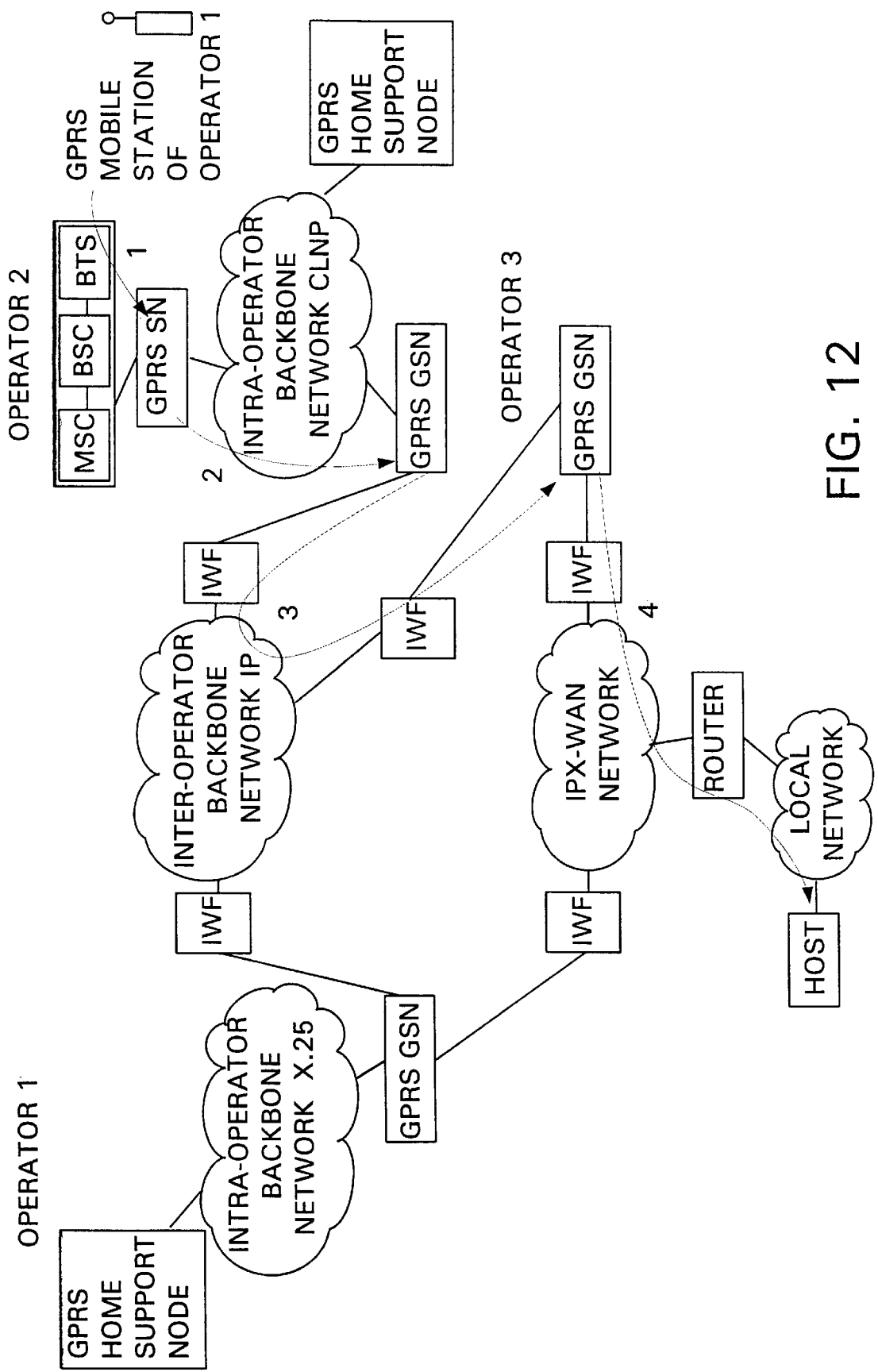
FIG. 12 is a block diagram.
Figure 13:
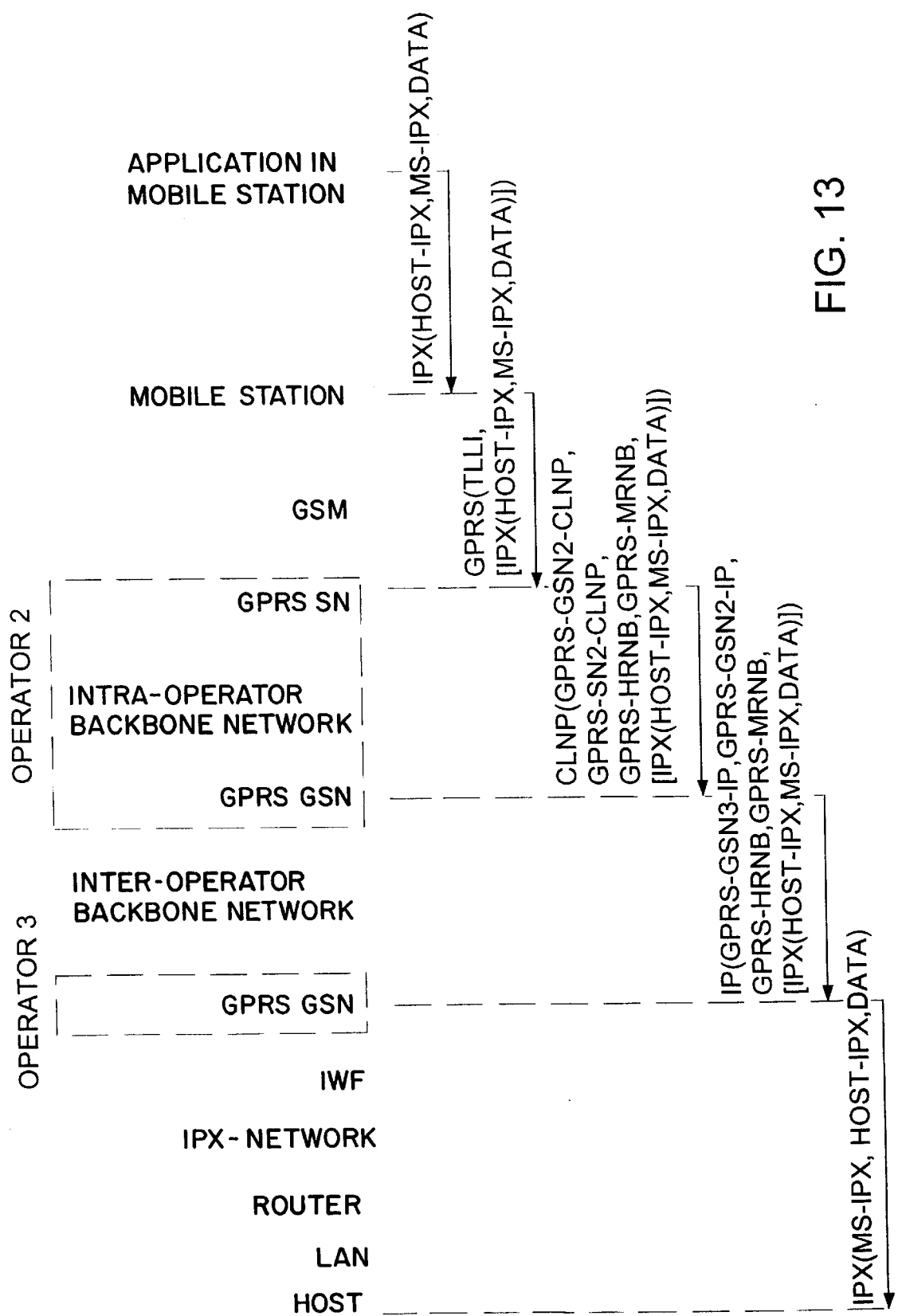
FIG. 13 is a signaling diagram which illustrate the routing of a mobile originated packet according to the invention when the mobile station is located in an extraneous network, and the packet is routed via a third network.

Visited operator does not support the protocol of the mobile station; routing via the gateway of a third party The following is a description of MO packet routing with reference to FIGS. 12 and 13 when a mobile station is located outside its home network, and the visited network does not understand the protocol of the mobile station, as a result of which the packet is routed via the GPRS network of a third party. In the example, the mobile station sends an IPX packet to the host computer.

1 and 2. These stages are identical with the stages 1 and 2 of FIGS. 8 and 9.

3. The GPRS GSN of the operator 2 receives the CLNP packet and checks the protocol of the encapsulated IPX packet. Since the GPRS GSN does not support the IPX protocol towards the data networks itself, it encapsulates the original IPX packet in an IP packet and sends the IP packet to the gateway support node GPRS GSN of the operator 3, since the operator 2 has made an agreement with the operator 3 to forward IPX packets.

4. The GPRS GSN of the operator 3 receives the IPX packet encapsulated in the IP packet via the inter-operator backbone network and checks the protocol of the encapsulated IPX packet. Since this GPRS GSN supports the IPX protocol towards the data networks itself, it strips the encapsulation away and sends the original IPX packet via IPX networks to the host computer Host.

The method described above may simplify packet routing, for instance, in the following situation. If a mobile station of a Finnish operator is visiting Germany and communicating with a German host computer Host, and the visited GPRS network does not support the protocol of the mobile station, it is possible, by the method of the invention, to avoid back and forth traffic between Germany and Finland in the inter-operator backbone network in the case of mobile originated packets, since the packets can be routed to the host computer via another German GPRS operator, which supports the IPX protocol.

As stated above, a protocol suited for encapsulating data packets in GPRS networks is Point-to-Point Protocol (PPP) defined in standards RFC 1661 and 1662 of Internet Architecture Board (IAB). PPP uses the principles, terminology and frame structure of ISO-3309-1979 High-level Data Link Control (HDLC) procedures. One solution for using the PPP protocol in GPRS networks and for transferring packets by the GPRS protocol over the radio interface is disclosed in a copending Finnish Patent Application 950117.

The figures and the description relating thereto are merely intended to illustrate the present invention. In its details, the invention may vary within the scope and spirit of the appended claims.

We claim:

1. A packet radio network, comprising:
    a plurality of support nodes;
    an internal packet network interconnecting said plurality of support nodes and providing a protocol-independent routing of data packets between a mobile station and a party connected to at least one external network; and
    a database for maintaining information which maps at least one network address of said mobile station with dynamic roaming information, said dynamic roaming information being inserted into a mobile terminating data packet encapsulated according to said internal protocol of said packet radio network in order to enable routing of said mobile terminating data packet to said one of said support nodes within an area in which said mobile station is located, wherein
        each of said plurality of support nodes uses an internal protocol of said packet radio network towards said internal packet network,
        at least one of said plurality of support nodes, which serves at least one mobile station use a radio interface link protocol towards a radio interface,
        a gateway support node, which interfaces said packet radio network to said at least one external network, uses a protocol of said external network towards said external network, and
        during internal routing of said packet radio network, a data packet received from said mobile station or said external network is encapsulated according to said internal protocol of said packet radio network.

2. The packet radio network according to claim 1, wherein said plurality of support nodes and said internal packet network are within at least one computer.

3. The packet radio network according to claim 2, wherein said at least one external network is another packet radio network, a network interconnecting packet radio network, and/or data network.

4. The packet radio network according to claim 2 or 3, wherein said gateway support node encapsulates a data packet to be sent to said external network in a packet according to a protocol of said external network when said data packet is sent to an external backbone network, but does not encapsulate said data packet when said data packet is sent to a data network.

5. The packet radio network according to claim 1, further comprising:
    a second database for maintaining information, which maps an identity data of each said mobile station with said at least one network address of said respective mobile station.

6. A method for a protocol-independent routing of packets between a mobile station and a party connected to an external network in a packet radio network, said packet radio network comprises a plurality of support nodes and an internal packet network interconnecting said plurality of support nodes, said method comprising:
    utilizing an internal protocol of said packet radio network towards said internal packet network at each of said plurality of support nodes;
    utilizing at least one of said plurality of support nodes that serves at least one mobile station, which uses a radio interface link protocol towards a radio interface at said support nodes which serve said at least one mobile station;
    utilizing a protocol of an external network towards said external network at a gateway support node, which interfaces said packet radio network to at least one said external network;
    encapsulating data packets received from said mobile station or from said external network, according to a protocol of said packet radio network;
    routing an encapsulated data packet in said packet radio network, according to said protocol of said packet radio network;
    stripping said encapsulation according to said protocol of said packet radio network away, when said data packet is transferred from said packet radio network to said external network;
    maintaining in a database, information which maps at least one network address of said mobile station with dynamic roaming information; and
    inserting said dynamic roaming information into a mobile terminating data packet encapsulated according to an internal protocol of said packet radio network in order to enable routing of said mobile terminating data packet to one of said support nodes within an area in which said mobile station is located.

7. A method for routing a mobile terminated data packet when a mobile station is located outside its home packet radio network, and routing between packet radio networks is required, each packet radio network comprises a plurality of support nodes and an internal packet network interconnecting said plurality of support nodes, said method comprising:
    sending, by a sending party, a data packet according to a first protocol, said data packet containing a network address according to said first protocol for said mobile station;
    routing said data packet via at least one external network to a gateway support node of a home packet radio network of said mobile station by using a routing according to said first protocol;
    encapsulating, by said gateway support node, said data packet of said first protocol according to an internal protocol of said home network packet radio;
    sending, by said gateway support node, said encapsulated data packet to a home support node of said mobile station;
    determining by said home support node of said mobile stations a roaming number of said mobile station by said network address of said first protocol for said mobile station, said roaming number indicating a node of another packet radio network;
    routing, by said home support node, said encapsulated data packet to said gateway support node of said home network;

stripping, by said gateway support node of said home network encapsulation away according to said internal protocol of said home network, and encapsulating a data packet of said first protocol according to a protocol used in inter-network traffic between said home packet radio network and said another packet radio network;

routing, by said gateway support node of said home network, said encapsulated data packet to said gateway support node of said other packet radio network;

stripping, by said gateway support node of said other packet radio network, encapsulation away according to an inter-network protocol, and encapsulating said data packet of said first protocol according to said internal protocol of said other packet radio network;

routing, by said gateway support node of said other packet radio network, said encapsulated data packet to said support node indicated by said roaming number in said other packet radio network;

stripping, by said support node of said other packet radio network, encapsulation away according to said internal protocol of said other packet radio network, and sending a data packet over a radio interface to said mobile station encapsulated according to a radio link protocol; and stripping, by said mobile station encapsulation away according to said radio link protocol.

8. A method for routing a mobile originated data packet via an external data network to a receiving party when a mobile station is located outside a home packet radio network in a first packet radio network, which does not support a first protocol used by said mobile station, each packet radio network comprises a plurality of support nodes and an internal packet network interconnecting said plurality of support nodes, said method comprising:

encapsulating, by said mobile stations a data packet of said first protocol according to a radio link protocol, said data packet containing a network address according to said first protocol for said receiving party;

sending, by said mobile station, said data packet encapsulated according to said radio link protocol over a radio interface to a support node serving said mobile station in said first packet radio network;

stripping, by a serving node, encapsulation away according to said radio link protocol, and encapsulating said data packet of said first protocol according to an internal protocol of said first packet radio network;

routing, by said serving node, said encapsulated data packet to a gateway support node of said first packet radio network, according to said internal protocol;

stripping, by said gateway support node of said first packet radio network, encapsulation away according to said internal protocol of said first packet radio network, and encapsulating said data packet of said first protocol according to an inter-network protocol used in inter-network traffic between said first packet radio network and said home packet radio network of said mobile station;

routing, by said gateway support node of said first packet radio network, said encapsulated data packet to said gateway support node of said home packet radio network;

stripping, by said gateway support node of said home packet radio network, encapsulation away according to said inter-network protocol, and routing, by said gateway support node of said home packet radio network supporting said first protocol, said data packet to an external data network of said first protocol by using a routing mechanism according to said first protocol.

9. A method for routing a mobile originated data packet via a first packet radio network and an external data network to a receiving party when a mobile station is located outside a home packet radio network in said second packet radio network, which does not support a first protocol used by said mobile station, each packet radio network comprises a plurality of support nodes and an internal packet network interconnecting said plurality of support nodes, said method comprising:

encapsulating, by said mobile station, a data packet of said first protocol according to a radio link protocol, said data packet containing a network address according to said first protocol for said receiving party;

sending, by said mobile station, said data packet encapsulated according to a radio link protocol over a radio interface to a support node serving said mobile station in said first packet radio network;

stripping, by a serving node encapsulation away according to said radio link protocol, and encapsulating said data packet of said first protocol according to an internal protocol of said first packet radio network;

routing, by said serving node, said encapsulated data packet to a gateway support node of said first packet radio network according to said internal protocol;

stripping, by said gateway support node of said first packet radio network, encapsulation away according to said internal protocol of said first packet radio network, and encapsulating said data packet of said first protocol according to an inter-network protocol used in inter-network traffic between said first packet radio network and said second packet radio network, said second packet radio network supporting said first protocol;

routing, by said gateway support node of said first packet radio network, said encapsulated data packet to said gateway support node of said second packet radio network;

stripping, by said gateway support node of said second packet radio network, encapsulation away according to said inter-network protocol and routing, by said gateway support node of said second packet radio network, supporting said first protocol, said data packet to an external data network of said first protocol by using a routing mechanism according to said first protocol.

10. The method according to any one of claims 6, 7, 8, and 9 wherein said plurality of support nodes and the internal packet network are within at least one computer.

11. The method according to any one of claims 6, 7, 8, and 9, wherein said home support node is used as said gateway node towards said external network.

* * * * *